United States Patent [19]

Dayton et al.

[11] Patent Number: 4,900,937
[45] Date of Patent: Feb. 13, 1990

[54] WELL LOGGING DETECTOR WITH DECOUPLING OPTICAL INTERFACE

[75] Inventors: Roderick R. Dayton, Chesterland; Michael C. Papp, Chardon; Glenn T. Tokos, Garrettesville, all of Ohio

[73] Assignee: Bicron Corporation, Newbury, Ohio

[21] Appl. No.: 260,246

[22] Filed: Oct. 20, 1988

[51] Int. Cl.⁴ ............................................. G01T 1/202
[52] U.S. Cl. .............................. 250/483.1; 250/361 R; 250/368
[58] Field of Search ................. 250/483.1, 368, 361 R

[56] References Cited

U.S. PATENT DOCUMENTS

| | | | |
|---|---|---|---|
| 2,902,603 | 9/1959 | Ferre | 250/368 |
| 4,004,151 | 1/1977 | Novak | 250/485.1 |
| 4,158,773 | 6/1979 | Novak | 250/361 R |
| 4,360,733 | 11/1982 | Novak et al. | 250/361 R |
| 4,383,175 | 5/1983 | Toepke | 250/368 |
| 4,764,677 | 8/1988 | Spurney | 250/361 R |
| 4,833,320 | 5/1989 | Hurlbut | 250/256 |

Primary Examiner—Constantine Hannaher
Attorney, Agent, or Firm—Pearne, Gordon, McCoy & Granger

[57] ABSTRACT

A well logging detector includes an elongated scintillation crystal having one end biased against and optically coupled to a transparent window portion of the detector housing. The biasing force on the crystal is provided by a compression spring located at and bearing against the other end of the crystal. The biasing force applied to the crystal by the spring is weak enough to allow the crystal to move away from and optically decouple from the window portion in response to shock forces on the detector. Subsequent to such shock induced decoupling, the biasing spring moves the crystal against the window portion to re-establish optical coupling therebetween. Such a biasing structure precludes excessive axial loading of the crystal by shock forces tending to move the crystal against the window as opposed to away from it. Such a shock resistant detector is especially well suited to measurement-while-drilling (MWD) applications.

12 Claims, 1 Drawing Sheet

WELL LOGGING DETECTOR WITH DECOUPLING OPTICAL INTERFACE

BACKGROUND OF THE INVENTION

The present invention relates in general to well logging detectors of the scintillation crystal type, and more particularly to a ruggedized detector characterized by its high shock resistance. The detector in accordance with the invention is especially useful in measurement-while-drilling (MWD) applications wherein high shock loads on the detector are common.

U.S. Pat. Nos. 4,004,151; 4,158,773; 4,360,733; 4,383,175 and 4,764,677 all illustrate well logging detectors of the scintillation crystal type. These U.S. patents are owned by the assignee of the present invention, and are incorporated by reference herein in their entireties.

In detectors of the type disclosed in the above-noted patents, a cylindrical scintillation crystal, such as a thallium-activated alkali halide (e.g. sodium iodide) crystal, is coaxially contained within, and is hermetically sealed within, a cylindrical metal housing typically formed from stainless steel. One end of the housing has a light transparent window portion. When ionizing radiation, such as gamma radiation, impinges on the crystal, light pulses, i.e. photons, are generated within the crystal. These radiation induced light pulses exit the detector via the window portion of the detector housing. The exiting light pulses in turn are detected by an associated photomultiplier tube whose output is an electrical signal that can then be analyzed to determine the characteristics of the radiation impinging on the scintillation crystal.

In four of the above noted patents, namely U.S. Pat. No. 4,004,151; 4,360,733, 4,383,175 and 4,764,677, a compression spring applies a biasing force against one end of the crystal to maintain the other end of the crystal in optical coupling relationship with the window portion of the detector housing. The compression spring is necessary to accommodate substantial thermal expansion and contraction of the crystal within the detector housing that occurs during well logging. Typically, aluminum oxide powder, which is light reflective, is packed between the outer surface of the cylindrical crystal and the inner surface of the cylindrical housing. The packed powder serves to support and maintain the crystal at its coaxial position within the housing. It also acts as a shock absorber to protect the crystal.

Should the crystal move away from and separate from the window portion of the detector as a result of shock forces on the detector, the aluminum oxide powder could migrate between the scintillation crystal and window portion thus deleteriously affecting optical coupling therebetween. To preclude movement of the crystal away from the window portion of the detector, the aforementioned compression spring applies a large magnitude biasing force, for the most strenuous shock environment, on the order of 1,000 times the weight of the crystal, i.e. for a 1,000 g tolerant detector—1,000 times the crystal mass. For example, a one pound crystal having a two inch diameter would have applied to its nonwindow end a spring force of approximately 330 psi. High shock forces on the detector tending to move the crystal away from the window portion are thus resisted by the compressed biasing spring.

Problems arise due to the high biasing forces required to maintain the optical coupling interface between the crystal and the window portion. First, the high biasing force applied to the crystal is necessarily transferred and applied to the window portion. Thus, both the crystal and the window portion are under stress induced by the biasing spring, and can fail especially under the high-thermal transients frequently experienced during well logging. Secondly, shock induced movement of the crystal against the window portion, as opposed to away from it, can blow out the window portion and/or fracture the crystal which in effect is rammed against the window under such shock induced movement. This is because the force on the crystal and window portion are the combination of the spring force and the shock induced inertial force or g-force of the crystal against the window portion. Also, under shock induced vibrations, the packed aluminum oxide powder can shift inside of the detector so as not to properly support the crystal. The shifting powder can also grind detector components.

The present invention substantially minimizes the abovenoted problems, and provides a highly ruggedized, shock resistant detector.

SUMMARY OF THE INVENTION

A well logging detector has a housing with a light transparent window portion. A scintillation member contained within the housing generates light in response to ionizing radiation impinging on it. A biasing means applies a biasing force against the scintillation member to hold it against, and optically couple it to, the window portion of the housing wherein the light generating within the housing member is transmitted to the exterior of the housing via the window portion.

In accordance with the present invention, the biasing force is weak enough to allow the scintillation member to move away from, and optically decouple and physically separate from, the window portion in response to shock forces on the detector. The biasing means, subsequent to such shock induced decoupling, moves the scintillation member back against the window portion to a re-establish optical coupling therebetween.

In a preferred form of the invention, the biasing means is constituted by a compression spring that applies a biasing force to the crystal not greater than 150 times the crystal weight and preferably about 50 times the crystal weight. Also, the well logging detector of the invention can include a light transparent, shock absorbent pad sandwiched between the window portion of the housing and the scintillation member, wherein the pad is separable from the window portion and the scintillation member. Both sides of the pad can be wetted with a light transparent liquid which enhances the ability of the scintillation member to optically recouple with the window portion subequent to shock induced decoupling of the optical interface area between the scintillation member and the window portion.

A further feature of the present invention includes the provision of an elongated tubular member contained within the housing, the tubular member being formed of potting material. The scintillation member in the preferred form of an elongated crystal is located within the interior of, and is supported by, the tubular member of potting material such that the scintillation crystal can slide back and forth along its longitudinal axis within the tubular member. Sliding movement of the scintillation crystal back and forth within the tubular member of potting material is enhanced by the provision of a layer of light reflective material such as polytetraflouroethylene tape that is wound about the axial length of the crystal. The use of potting material also eliminates the heretofore noted problem of shifting of packed aluminum oxide powder.

The well logging detector in accordance with the present invention has been found to be highly resistive to shock forces on the detector wherein it can be used in the high shock environment of measurement-while-drilling (MWD) applications.

BRIEF DESCRIPTION OF THE DRAWINGS

A fuller understanding of the invention may be held by referring to the following description and claims taken in conjunction with the accompanying drawing wherein:

DETAILED DESCRIPTION OF THE PREFERRED EMBODIMENT

Figure 1:
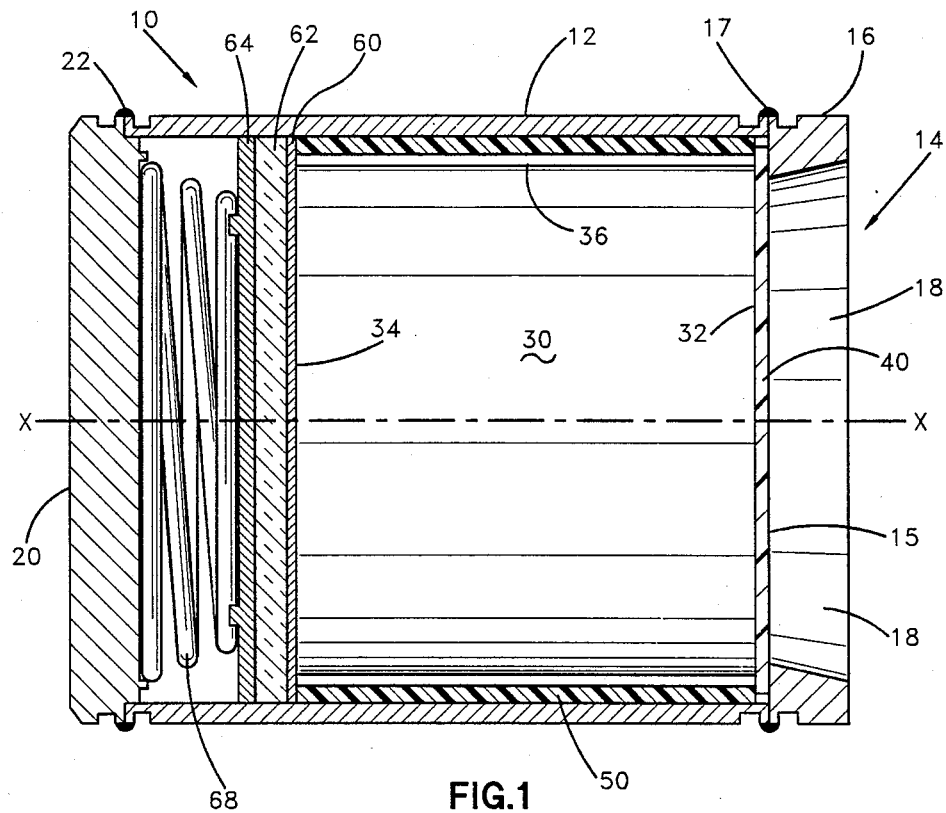
FIG. 1 is a longitudinal cross-section view of a well logging detector of the scintillation crystal type in accordance with the present invention.

With reference to FIG. 1, a well logging detector 10 of the scintillation crystal type is illustrated. The general shape of the detector 10 is that of a cylinder lying along an axis X-X as illustrated. The detector 10 includes an elongated housing formed from a metal tube 12 of for example stainless steel or other high strength alloy. One end of the metal tube 12 is closed by a window portion 14 comprised of an annular, window retaining ring 16, of stainless steel or the like, which carries a circular disc-shaped glass window 18. The other end of the metal tube 12 is closed by a metal end cap 20 as illustrated, the metal end cap also being formed from stainless steel or the like.

The window portion 14 and the end cap 20 are fixed to their respective ends of the tube 12 by means of weld seams 17, 22 that circumferentially extend about the respective ends of the detector 10 as illustrated. The resultant housing formed by the tube 12, the window portion 14 and the end cap 20 constitute a hermetically sealed (air tight) structure containing the operating elements of the detector 10. Details as to the welding of the window portion 14 and the end cap 20 to the ends of the tube 12 are set forth in the aforementioned U.S. Pat. No. 4,383,175. This patent also discloses the means and method for mounting the glass window 18 within the annular ring 16 so as to establish a glass-to-metal seal interface between them.

With further reference to FIG. 1, the detector 10 contains within it a scintillation member in the illustrated form of a scintillation crystal 30. The crystal 30 is for example a thallium-activated alkali halide, e.g. sodium iodide, crystal which is well known in the art. The illustrated crystal is in the shape of a cylinder and has a front end face 32 and a rear end face 34, the elongated crystal being coaxially positioned along longitudinal axis X-X as illustrated. As is well known in the art, ionizing radiation penetrating the housing constituted by housing elements 12, 14 and 20 will impinge on the crystal 30 and cause it to scintillate, that is cause it to generate photons of a particular wavelength in response to the ionizing radiation of a particular type. The photons generated within the crystal 30 passed to the exterior of the detector 10 via the glass window 18 which is transparent to the photons. By transparent it is to be understood that the glass window 18 is transparent to the wavelength of the photons generated and not necessarily transparent to the visible light spectrum. For example, the generated photons could be ultra-violet radiation as opposed to visible light. Therefore, the glass window 18 could be translucent to visible light and yet transparent to the ultraviolet radiation of interest being generated by the scintillation memebr 30.

In addition to the front end face 32 and the rear end face 34, the crystal 30 provides an outer surface of revolution 36 which extends along the length of the crystal. As is known in the art, the surfaces 34, 36 have applied to them a light reflective material so that, to the greatest extent possible, scintillation generated photons exit the crystal 30 via its front end face 32. The light reflecting material applied to the rear end face 34 can be in the form of one or more layers 60 of light reflective polytetraflouroethylene tape. In a similar fashion, and with reference to FIG. 2, the outer surface 36 of the crystal 30 can be wrapped by several layers 54 of polytetraflouroethylene tape, whose outermost layer in turn is wrapped and covered by a layer 52 of metal foil tape. The provision of light reflective material on the surfaces 34, 36 of the crystal 30 is more fully disclosed in aforementioned U.S. patent 4,764,677.

Figure 2:
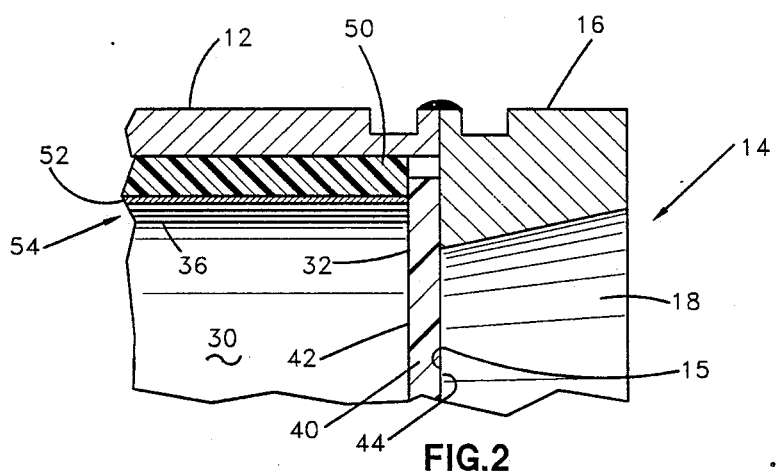
FIG. 2 is an enlarged sectional view of the detector illustrated in FIG. 1.

Located between an inner surface 15 of the window portion 14 and the front end face 32 of the crystal 30 is an elastomeric pad, that is formed by casting, prior to assembly of the detector 10, from a transparent silicone based material such as Dow Corning No. 186 silicone rubber which is manufactured and sold by the Dow Corning Company, The pad 40 is rubberlike in consistency and, as shown most clearly in FIG. 2, provides an inner face 42 and an outer face 44. Preferably the inner and outer face 42, 44 are covered by a thin film of liquid such as a high viscosity vacuum grease a ("Dow Corning Vacuum Grease") manufactured and sold by the Dow Corning Company. The liquid on the surfaces 42, 44 function as a wetting agent so as to enhance optical coupling between the front end face 32 of the crystal 30 and inner face 42 of the pad 40, and in a similar manner between inner surface 15 of the window portion 14 and the outer face 44 of the pad 40.

In accordance with the present invention, both the front end face 32 of the crystal 30 and the inner surface 15 of the window portion 14 are separable from the pad 40. In effect, the crystal 30, the pad 40 and the window portion 14 can, by design, physically decouple from each other. Such decoupling is possible because, with reference to FIG. 1, the crystal 30 is longitudinally movable back and forth along axis X-X in response to shock forces on the detector 10 tending to cause the crystal 30 to move away from the window portion 14. To maintain optical coupling between the crystal 30 and the window portion 14 during normal operating conditions, a biasing means in the form of a compression spring 68 is provided between the inter surface of the end cap 20 and the rear face 34 of the scintillation crystal 30. It can be seen that one end of the compressed spring 68 bears aginst the end cap 20, while its other end bears aginst the metal backing plate 64 which in turn bears against an elastomeric precast elastomeric pad 62 made for example from the aforementioned Dow Corning No. 186 silicone rubber material. The elastomeric pads 40, 62 serve, as a part of their function, as cushioning mebers to protect the crystal 30 against shock forces.

The outer surface 36 of the scintillation crystal 30 is supported in coaxial position within the detector 10 by means of a tubular member 50 formed of potting material having elastomeric characteristics. The potting material formed tubular member 50 is generally fixed in position relative to the metal tube 12 forming a portion of the housing of the detector 10. With reference to FIG. 2, the tape layers 52, 54 are also generally fixed in relation to tubular member 50 so that elements 12, 50, 52 and 54 function together to comprise, in effect, a cylinder block within which crystal 30 can slide or reciprocate back and forth to a limited degree in response to high shock forces on the detector 10.

In accordance with the invention, the biasing force provided by compression spring 68 is weak enough to allow the crystal 30 to move away and pysically separate from the window portion 14 so as to optically decouple from it. Preferably, the biasing force applied to the rear end face 34 of the crystal 30 is not greater than 150 times the crystal weight and is preferably on the order to 50 times the crystal weight. By design, the biasing force is substantially less than the maximum shock "g" load times the crystal weight. This is contrary to the four patented prior art detectors as noted above wherein spring forces well over 150 times the crystal weight are utilized in order to preclude optical decoupling of a scintillation crystal from its associated window portion of its housing under high shock forces. Because of the weak biasing force provided by compression spring 68, shock forces tending to move or ram the crystal 30 against the window portion 14 are not supplemented by high biasing forces from the spring 68. The weak biasing force from the spring 68 only needs to move the crystal 30 back towards the window portion 14 so as to re-establish the optical coupling therebetween, the elastomeric pad 40 with its wetted surfaces 42, 44 re-establishing optical coupling upon return of the crystal 30 to its normal position within the metal tube 12 of the detector housing as illustrated in FIGS. 1 and 2.

The detector as set forth above has been found to be extremely tolerant to high shock loads since, instead of fighting such loads to maintain optical coupling between the scintillation crystal and the window portion of the housing, optical decoupling is permitted by design and means are provided for re-establishing optial coupling, such means being constituted by the relatively weak biasing force provided by the compression spring 68 and the axial sliding of the crystal 30 within the tubular member 50. Because the detector 10 does not include any packed aluminum oxide powder as was the common practice in prior art detectors as discussed earlier, no contamination of the separated and decoupled optical interface between the crystal and the window portion 14 can occur. Also, the problems of powder shifting and grinding due to vibration is eliminated. Also, the elastomeric members 40, 50, 62, which can all be formed for example from the aforementioned Dow Corning No. 186 silicone rubber or the like, insulate the crystal 30 from normal shock forces not strong enough to decouple the crystal 30 as noted earlier. By design, the biasing spring holds the crystal in place against the window against such normal shock forces, while it allows optical decoupling under high shock loads as noted earlier.

The detector 10 in accordance with the present invention can been assembled by first spirally wrapping the crystal about its surface 36 with the earlier noted tape layers 54, 52. The wrapped crystal 30 is then inserted into the metal tube 12. With the crystal 30 coaxially positioned within the metal tube 12, uncured potting material 50 is poured around the outside of the wrapped crystal 30 to provide tubular member 50, the metal foil layer 52 preventing the potting material from migrating into and otherwise deleteriously affecting the light reflective tape layers 54. The pad 40 with both surfaces 42, 44 wetted by the aforementioned vacuum grease is then applied to or in effect stuck on to the front end face 32 of the crystal 30, so that the inner surface 42 of the pad 40 contacts and optically couples to the front end face 32 of the crystal. The window portion 14 is then put in place so that pad surface 44 contacts the inside surface 15 of the window portion 14. The window portion 14 is then welded to the front end of the tube 12 as illustrated. Subsequently, the reflective material 60, in the form of one or more layers of tape or film, is applied to the rear end face 34 of the crystal 30. The precast pad 62 is then inserted into the metal tube 12, and then the backing plate 64 is inserted as illustrated. As a final step, the compression spring 68 is inserted and then the end cap 20 is pushed into the end of the metal tube 12 to compress the spring 68 to a predetermined degree (for providing the "weak" biasing force) wherein welded seam 22 is provided to seal the detector 10 and to fix the end cap 20 to the end of the metal tube 12. It is to be noted that the assembly procedure for the detector 10 occurs in the manner that will provide an inert atmosphere within the detector 10 in accordance with the teachings of the aforementioned U.S. Pat. No. 4,764,677.

While the invention has been shown and described with respect to a particular embodiment thereof, this is for the purpose of illustration rather than limitation, and other variations and modifications of the specific embodiment herein shown and described will be apparent to those skilled in the art all within the spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. In a well logging detector having a housing with a light transparent window portion, a scintillation member contained within the housing, the scintillation member generating light in response to ionizing radiation impinging on the scintillation member, and biasing means applying a biasing force against the scintillation member to hold it against and optically couple it to the window portion wherein the light generated by the scintillation member is transmitted to the exterior of the housing via the window portion, the improvement wherein said biasing force is weak enough to allow the scintillation member to move away from and optically decouple from the window portion in response to shock forces on the detector, the biasing means, subsequent to such shock induced decoupling, moving said scintillation member back against said window portion to re-establish optical coupling therebetween.

2. The detector according to claim 1, wherein the biasing means is a compression spring compressed between the housing and said scintillation member, said compression spring applying a biasing force to said scintillation member not greater than 150 times the weight of the scintillation member.

3. The detector according to claim 1, wherein said window portion and said scintillation member are separated by a light transparent, shock absorbent pad, said pad being sandwiched between said window portion and said scintillation member, said pad being separable from said scintillation member, said pad being separable from said window portion and said scintillation member.

4. A detector according to claim 3, wherein said pad has two sides, both of which are wetted with a light transparent liquid, one side of said pad being in contact with and optically couplable to said window portion, the other side of said pad being in contact with and optically to said scintillation member.

5. In a well logging detector having an elongated housing including at one end thereof a light transparent window portion, an elongated scintillation crystal coaxially contained within the housing, the scintillation crystal generating light in response to ionizing radiation impinging on the crystal, a compression spring contained within the housing and applying a biasing force against one end of the crystal, the other end of the crystal being biased against and optically coupled to said window portion wherein the light generated by the scintillation crystal is transmitted to the exterior of the housing via the window portion, the improvement wherein the biasing force is weak enough to allow the scintillation crystal to move away from and optically decouple from and separate from the window portion in response to shock forces on the detector, the biasing spring, subsequent to such shock induced decoupling, moving said scintillation crystal back against said window portion to reestablish optical coupling therebetween, wherein excessive axial loading of the elongated crystal by shock forces on the crystal tending to move the crystal against the window portion are minimized to preclude damage to the crystal and the window portion.

6. A well logging detector according to claim 5, including an elongated tubular member contained within said housing, said tubular member being formed of potting material, said elongated crystal being located within the interior of and being supported by said tubular member, said crystal being movable relative to said elongated tubular member wherein said crystal slides back and forth along its longitudinal axis within said tubular member.

7. A well logging detector according to claim 6, including a layer of light reflective material located between said tubular member and said crystal.

8. A well logging detector according to claim 7, wherein said light reflective material acts as a lubricant to facilitate sliding movement of said crystal within said tubular member.

9. A well logging detector according to claim 7, wherein said light reflective layer includes polytetraflouroethylene tape wound about the axial length of said elongated crystal member so as to constitute at least a portion of said light reflective layer.

10. A well logging detector according to claim 5, including a light transparent, shock absorbing elastomeric pad having a first side in contact with said other end of the crystal, and a second side in contact with said window portion, said pad being sandwiched between said other end of the crystal and said window portion.

11. A well logging detector according to claim 10, wherein said first and second side of said pad are wetted with a transparent liquid.

12. A well logging detector according to claim 11 wherein said liquid is a high viscosity silicone based grease.

* * * * *

UNITED STATES PATENT AND TRADEMARK OFFICE
CERTIFICATE OF CORRECTION

PATENT NO. : 4,900,937

DATED : February 13, 1990

INVENTOR(S) : Dayton et al.

It is certified that error appears in the above-identified patent and that said Letters Patent is hereby corrected as shown below:

Column 2, line 4, delete "the" (second occurrence).

Column 2, line 20, delete "abovenoted" and insert --above-noted--.

Column 3, line 12, delete "held" and insert --had--.

Column 4, line 34, delete "face" and insert --faces--.

Column 4, line 35, delete "a" (second occurrence).

Column 4, line 60 delete "aginst" and insert --against--.

Column 4, line 65, delete "mebers" and insert --members--.

Column 5, line 14, delete "pysically" and insert --physically--.

Column 5, line 19, delete "to" and insert --of--.

Column 5, line 44, delete "optial" and insert --optical--.

UNITED STATES PATENT AND TRADEMARK OFFICE
CERTIFICATE OF CORRECTION

PATENT NO. : 4,900,937

DATED : February 13, 1990

INVENTOR(S) : Dayton et al.

It is certified that error appears in the above-identified patent and that said Letters Patent is hereby corrected as shown below:

Column 7, line 3 and 4, delete "scintillation member, said pad being separable from said".

Signed and Sealed this

Nineteenth Day of March, 1991

Attest:

HARRY F. MANBECK, JR.

*Attesting Officer*                *Commissioner of Patents and Trademarks*